United States Patent
Mishra et al.

(10) Patent No.: US 8,439,993 B2
(45) Date of Patent: May 14, 2013

(54) METHOD AND APPARATUS TO TRANSPORT SOLIDS

(75) Inventors: Sunil Ramabhilakh Mishra, Pearland, TX (US); Pradeep S. Thacker, Bellaire, TX (US); Anindra Mazumdar, Katy, TX (US); Vignesh Venkatraman, Tamil Nadu (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/606,903

(22) Filed: Sep. 7, 2012

(65) Prior Publication Data
US 2012/0324790 A1    Dec. 27, 2012

Related U.S. Application Data

(62) Division of application No. 12/652,440, filed on Jan. 5, 2010, now Pat. No. 8,277,523.

(51) Int. Cl.
- *B01J 7/00* (2006.01)
- *C01B 3/36* (2006.01)
- *C01B 6/24* (2006.01)
- *C10J 3/00* (2006.01)

(52) U.S. Cl.
USPC ............... 48/197 R; 48/61; 48/210; 423/644; 122/15.1

(58) Field of Classification Search ...... 48/61; 122/15.1
See application file for complete search history.

(56) References Cited

U.S. PATENT DOCUMENTS

| | | | |
|---|---|---|---|
| 3,775,071 A | 11/1973 | Hoffert et al. | |
| 4,334,893 A | 6/1982 | Lang | |
| 4,354,825 A | 10/1982 | Fisher et al. | |
| 4,617,109 A | 10/1986 | Wells | |
| 2008/0216406 A1 | 9/2008 | Wang et al. | |
| 2009/0107046 A1 | 4/2009 | Leininger et al. | |
| 2009/0178338 A1 | 7/2009 | Leininger et al. | |

FOREIGN PATENT DOCUMENTS

| | | | |
|---|---|---|---|
| CH | 169143 A | 5/1934 | |
| KR | 20060117015 A | 11/2006 | |

OTHER PUBLICATIONS

European Search Report regarding Application No. 10195574.8-1266/2341286 dated Jan. 2, 2012; 6 pages.

*Primary Examiner* — Matthew Merkling
(74) *Attorney, Agent, or Firm* — Armstrong Teasdale LLP

(57) ABSTRACT

A method of operating a gasification facility includes channeling a conveying fluid at a first temperature through at least one first steam heating device to increase the temperature of the conveying fluid to a second predetermined temperature. The method also includes channeling the conveying fluid at the second predetermined temperature through a second steam heating device to increase the temperature of the conveying fluid to a third predetermined temperature. The method further includes channeling the conveying fluid at the third predetermined temperature to a solids conveyance system. Solids become entrained within the conveying fluid. The method also includes transporting at least a portion of the solids to a gasification system.

10 Claims, 3 Drawing Sheets

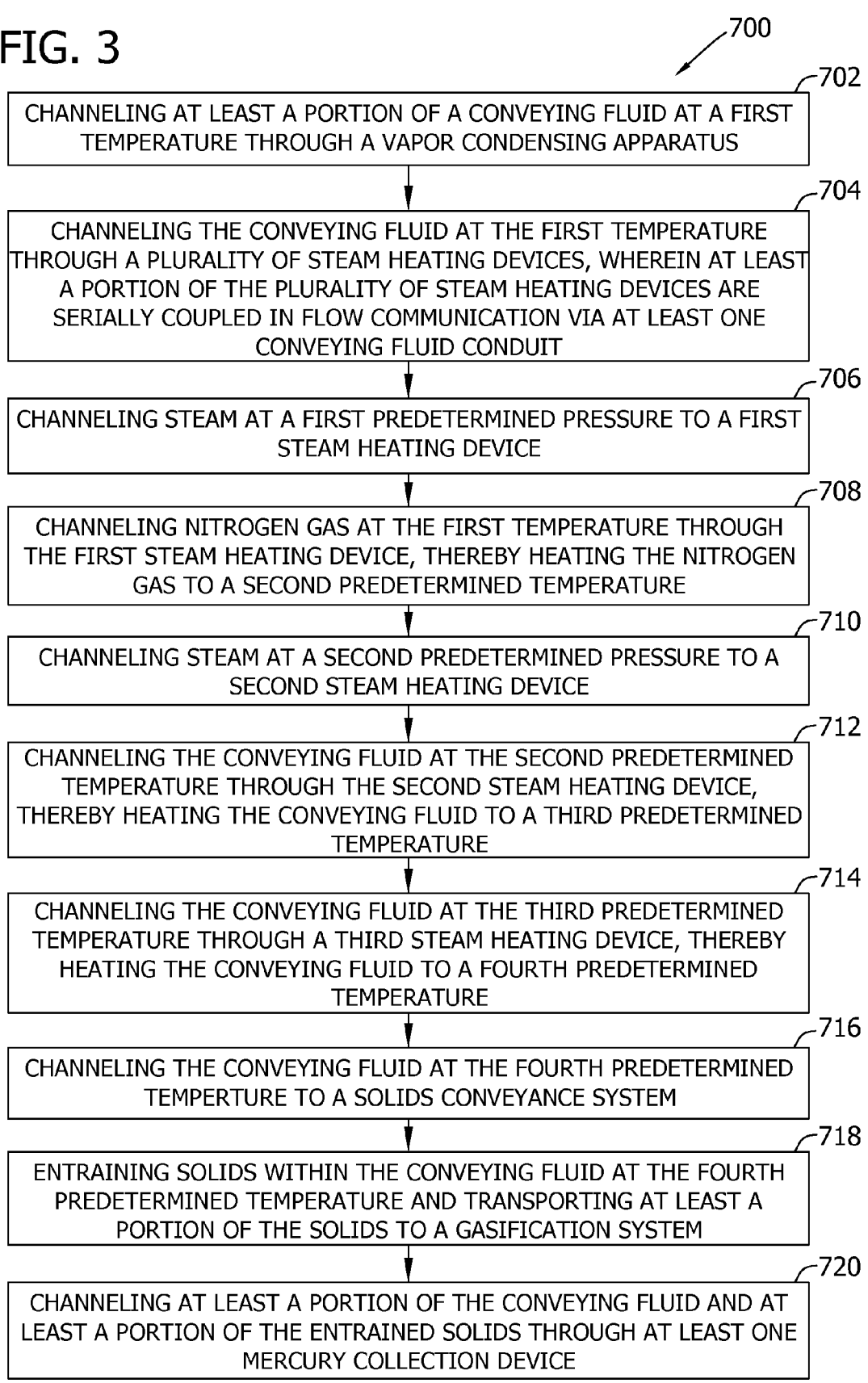

METHOD AND APPARATUS TO TRANSPORT SOLIDS

CROSS REFERENCE TO RELATED APPLICATIONS

This application is a divisional of U.S. patent application Ser. No. 12/652,440 filed Jan. 5, 2010 now U.S. Pat. No. 8,277,523, which is hereby incorporated by reference and is assigned to the assignee of the present invention.

BACKGROUND OF THE INVENTION

The embodiments described herein relate generally to solids transport systems, and more particularly, to methods and apparatus for transporting coal to facilitate operation of synthetic gas production facilities.

At least some known gasification plants include a gasification system that is integrated with at least one power-producing turbine system, thereby forming an integrated gasification combined cycle (IGCC) power generation plant. Such known gasification systems convert a mixture of fuel, air or oxygen, steam, and/or $CO_2$ into a synthetic gas, or "syngas". Also, many known gasification systems include a gasification reactor that receives such mixtures and generates syngas therein. Syngas is channeled to the combustor of a gas turbine engine, which powers a generator that supplies electrical power to a power grid. Exhaust from at least some known gas turbine engines is supplied to a heat recovery steam generator (HRSG) that generates steam for use in driving a steam turbine. Power generated by the steam turbine also drives an electrical generator that provides electrical power to the power grid.

At least some of the known gasification plants also include coal conveyance systems that grind, dry, and transport coal to the gasification system. However, such coal conveyance systems generally do not transport coal to the gasification system at temperatures and pressures that facilitate gasification system performance throughout a full range of operation of the gasification system.

BRIEF DESCRIPTION OF THE INVENTION

This Brief Description is provided to introduce a selection of concepts in a simplified form that are further described below in the Detailed Description. This Brief Description is not intended to identify key features or essential features of the claimed subject matter, nor is it intended to be used as an aid in determining the scope of the claimed subject matter.

In one aspect, a method of operating a gasification facility is provided. The method includes channeling a conveying fluid at a first temperature through at least one first steam heating device to increase the temperature of the conveying fluid to a second predetermined temperature. The method also includes channeling the conveying fluid at the second predetermined temperature through a second steam heating device to increase the temperature of the conveying fluid to a third predetermined temperature. The method further includes channeling the conveying fluid at the third predetermined temperature to a solids conveyance system. Solids become entrained within the conveying fluid. The method also includes transporting at least a portion of the solids to a gasification system.

In another aspect, a solids transport system is provided. The solids transport system is configured to convey solids at a predetermined temperature. The solids transport system includes at least one conduit coupled in flow communication to a conveying fluid source. The system also includes a plurality of steam heating devices. The plurality of steam heating devices are coupled together in flow communication by the at least one conduit.

In yet another aspect, a gasification facility is provided. The gasification facility includes a carbonaceous fuel source, at least one inert gas source, and a gasification reactor. The gasification facility also includes a coal transport system coupled in flow communication with the carbonaceous fuel source, the at least one inert gas source, and the gasification reactor. The coal transport system is configured to convey solids at a predetermined temperature. The coal transport system includes at least one conduit coupled in flow communication to a conveying fluid source. The system also includes a plurality of steam heating devices. The plurality of steam heating devices are coupled together in flow communication by the at least one conduit.

BRIEF DESCRIPTION OF THE DRAWINGS

The embodiments described herein may be better understood by referring to the following description in conjunction with the accompanying drawings.

FIG. 3 is a flow chart illustrating an exemplary method of operating the IGCC power generation plant shown in FIG. 1.

DETAILED DESCRIPTION OF THE INVENTION

Figure 1:
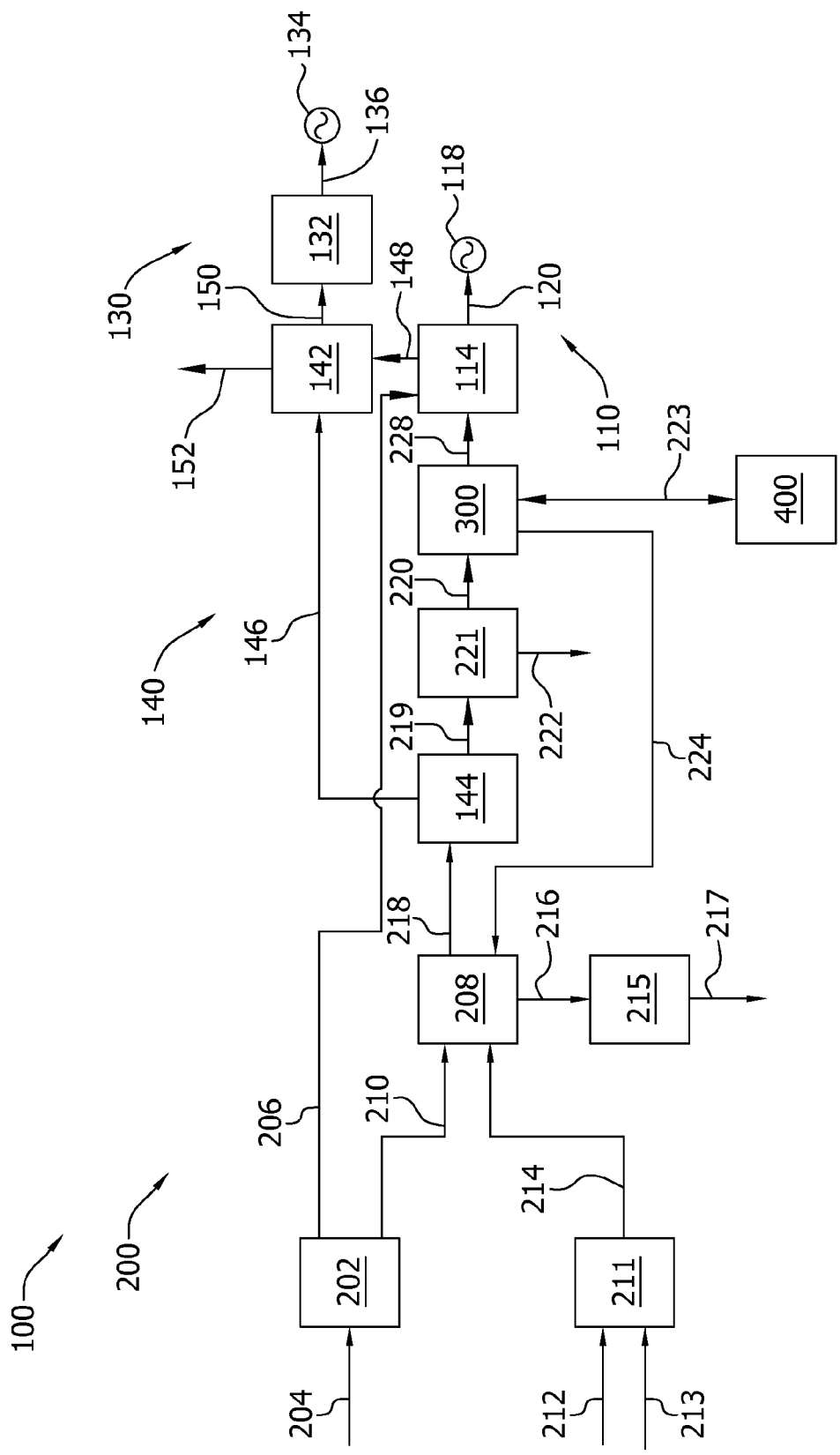
FIG. 1 is a schematic diagram of an exemplary integrated gasification combined-cycle (IGCC) power generation plant.

FIG. 1 is a schematic diagram of an exemplary chemical production facility, specifically, an exemplary gasification facility, and more specifically, an exemplary integrated gasification combined-cycle (IGCC) power generation plant 100. In the exemplary embodiment, IGCC power generation plant 100 includes a gas turbine engine 110. Turbine engine 110 includes a turbine 114 that is rotatably coupled to a first electrical generator 118 via a first rotor 120. Turbine 114 is coupled in flow communication with at least one fuel source and at least one air source (both described in more detail below) and receives fuel and air from the fuel source and the air source, respectively. Turbine 114 uses the mixed air and fuel to produce hot combustion gases (not shown) wherein the heat energy within the gases is converted to rotational energy. The rotational energy is transmitted to generator 118 via rotor 120, wherein generator 118 converts the rotational energy to electrical energy (not shown) for transmission to at least one load, including, but not limited to, an electrical power grid (not shown).

In addition, IGCC power generation plant 100 includes a steam turbine engine 130. In the exemplary embodiment, engine 130 includes a steam turbine 132 that is coupled to a second electrical generator 134 via a second rotor 136.

IGCC power generation plant 100 also includes a steam generation system 140. In the exemplary embodiment, system 140 includes at least one heat recovery steam generator (HRSG) 142 that is coupled in flow communication with at least one heat transfer apparatus 144 via at least one heated boiler feedwater conduit 146. HRSG 142 receives boiler feedwater (not shown) from apparatus 144 via conduit 146 for use in heating the boiler feedwater into steam (not shown). HRSG 142 also receives exhaust gases (not shown) from turbine 114 via an exhaust gas conduit 148 to further heat the boiler feedwater into steam. HRSG 142 is coupled in flow communication with turbine 132 via a steam conduit 150. Excess gasses and steam (both not shown) are exhausted from HRSG 142 to the atmosphere via stack gas conduit 152.

Conduit 150 channels steam (not shown) from HRSG 142 to turbine 132. Turbine 132 receives steam from HRSG 142 and converts the thermal energy in the steam to rotational energy. The rotational energy is transmitted to generator 134 via rotor 136, wherein generator 134 converts the rotational energy to electrical energy (not shown) for transmission to at least one load, including, but not limited to, the electrical power grid. The steam is condensed and is returned as boiler feedwater via a condensate conduit (not shown).

IGCC power generation plant 100 also includes a gasification system 200. In the exemplary embodiment, system 200 includes at least one air separation unit 202 that is coupled in flow communication with an air source via an air conduit 204. Such air sources may include, but are not limited to, dedicated air compressors and compressed air storage units (neither shown). Unit 202 separates air into oxygen ($O_2$), nitrogen ($N_2$), and other components (neither shown) that are either released via a vent (not shown) or channeled and/or collected for further use. For example, in the exemplary embodiment, $N_2$ is channeled to gas turbine 114 via a $N_2$ conduit 206 to facilitate combustion.

System 200 includes a gasification reactor 208 that is coupled in flow communication with unit 202 to receive oxygen channeled from unit 202 via an $O_2$ conduit 210. System 200 also includes a solids transport system 211, that is, a dry coal transport system. Dry coal transport system 211 is coupled in flow communication with a carbonaceous fuel source, that is, a dry coal source (not shown in FIG. 1), via a dry coal supply conduit 212. Dry coal transport system 211 is also coupled in flow communication with at least one conveying fluid source, that is, an inert gas source (not shown in FIG. 1), via an inert gas supply conduit 213. System 211 mixes dry coal and inert gas to form an inert gas conveying stream with entrained dry coal solids (neither shown in FIG. 1) at a predetermined temperature, wherein the stream is channeled to reactor 208 via a solids transport conduit 214, that is, a dry coal transport conduit 214.

Reactor 208 receives the inert gas conveying stream with entrained dry coal solids and an $O_2$ stream (not shown) via conduits 214 and 210, respectively. Reactor 208 produces a hot, raw synthetic gas (syngas) stream (not shown), that includes carbon monoxide (CO), hydrogen ($H_2$), carbon dioxide ($CO_2$), carbonyl sulfide (COS), and hydrogen sulfide ($H_2S$). While $CO_2$, COS, and $H_2S$ are typically collectively referred to as acid gases, or acid gas components of the raw syngas, hereon, $CO_2$ will be discussed separately from the remaining acid gas components. Moreover, reactor 208 also produces a hot slag stream (not shown) as a first gasification by-product resulting from syngas production. The slag stream is channeled to a slag handling unit 215 via a hot slag conduit 216. Unit 215 quenches and breaks up the slag into smaller slag pieces wherein a slag removal stream is produced and channeled through conduit 217.

Reactor 208 is coupled in flow communication with heat transfer apparatus 144 via a hot syngas conduit 218. Apparatus 144 receives the hot, raw syngas stream and transfers at least a portion of the heat to HRSG 142 via conduit 146. Subsequently, apparatus 144 produces a cooled raw syngas stream (not shown) that is channeled to a scrubber and low temperature gas cooling (LTGC) unit 221 via a syngas conduit 219. Unit 221 removes a second gasification by-product, that is, particulate matter entrained within the raw syngas stream and discharges the removed matter via a fly ash conduit 222. Unit 221 facilitates cooling the raw syngas stream, and converts at least a portion of COS in the raw syngas stream to $H_2S$ and $CO_2$ via hydrolysis.

System 200 also includes an acid gas removal subsystem 300 that is coupled in flow communication with unit 221 and that receives the cooled raw syngas stream via a raw syngas conduit 220. Subsystem 300 removes at least a portion of acid components (not shown) from the raw syngas stream as described in more detail below. Such acid gas components may include, but are not limited to, $CO_2$, COS, and $H_2S$. Subsystem 300 also separates at least some of the acid gas components into components that include, but are not limited to, $CO_2$, COS, and $H_2S$. Moreover, subsystem 300 is coupled in flow communication with a sulfur reduction subsystem 400 via a conduit 223. Subsystem 400 receives and separates at least some of the acid gas components into components that include, but are not limited to, $CO_2$, COS, and $H_2S$. The acid components removed and separated are channeled into at least one third gasification by-product stream (not shown) that is removed from system 200.

Furthermore, subsystem 400 channels a final integrated gas stream (not shown) to reactor 208 via subsystem 300 and a conduit 224. The final integrated gas stream includes predetermined concentrations of $CO_2$, COS, and $H_2S$ that result from previous integrated gas streams (not shown). Subsystem 300 is coupled in flow communication with reactor 208 via conduit 224 such that the final integrated gas stream is channeled to predetermined portions of reactor 208. The separation and removal of $CO_2$, COS, and $H_2S$ via subsystems 300 and 400 facilitates producing a clean syngas stream (not shown) that is channeled to gas turbine 114 via a clean syngas conduit 228.

In operation, air separation unit 202 receives air via conduit 204. The air is separated into $O_2$, $N_2$ and other components. The other components are vented via a vent, the $N_2$ is channeled to turbine 114 via conduit 206 and the $O_2$ is channeled to gasification reactor 208 via conduit 210. Also, in operation, dry coal transport system 211 receives dry coal and inert gas via conduits 212 and 213, respectively, forms a an inert gas conveying stream with entrained dry coal solids and channels the stream to reactor 208 via conduit 214.

Reactor 208 receives $O_2$ via conduit 210, coal via conduit 214, and the final integrated gas stream from subsystem 300 via conduit 224. Reactor 208 produces a hot raw syngas stream that is channeled to apparatus 144 via conduit 218. The slag by-product formed in reactor 208 is removed via slag handling unit 215 and conduits 216 and 217. Apparatus 144 facilitates cooling the hot raw syngas stream to produce a cooled raw syngas stream that is channeled to scrubber and LTGC unit 221 via conduit 219 wherein particulate matter is removed from the syngas via fly ash conduit 222, the syngas is cooled further, and at least a portion of COS is converted to $H_2S$ and $CO_2$ via hydrolysis. The cooled raw syngas stream is channeled to acid gas removal subsystem 300 wherein acid gas components are substantially removed such that a clean syngas stream is formed and channeled to gas turbine 114 via conduit 228.

Moreover, during operation, at least a portion of the acid components removed from the syngas stream are channeled to subsystem 400 via conduit 223 wherein acid components are removed and separated into at least one third gasification by-product stream (not shown) that is removed from the syngas stream. The final integrated gas stream is channeled to reactor 208 via subsystem 300 and conduit 224. In addition, turbine engine 110 receives $N_2$ and clean syngas via conduits 206 and 228, respectively. Turbine engine 110 combusts the syngas fuel, produces hot combustion gases and channels hot combustion gases downstream to induce rotation of turbine 114 which subsequently rotates first generator 118 via rotor 120.

At least a portion of heat removed from the hot syngas via heat transfer apparatus 144 is channeled to HRSG 142 via conduit 146 wherein the heat is used to boil water to form steam. Steam is channeled to steam turbine 132 via conduit 150 to induce rotation of turbine 132. Turbine 132 rotates second generator 134 via second rotor 136.

Figure 2:
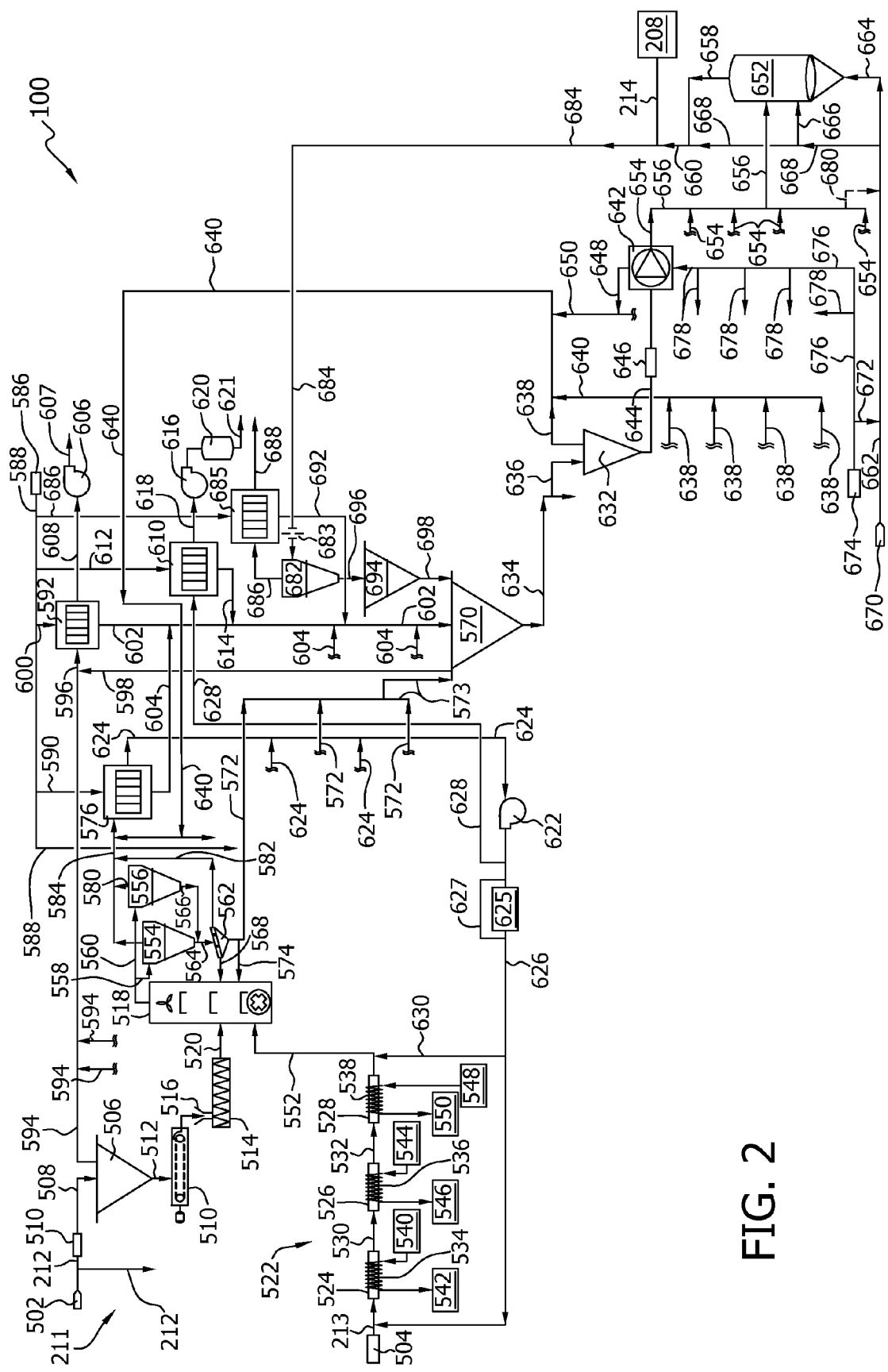
FIG. 2 is a schematic diagram of an exemplary dry coal transport system that may be used with the IGCC power generation plant shown in FIG. 1.

FIG. 2 is a schematic diagram of an exemplary dry coal transport system 211 that may be used with IGCC power generation plant 100. Dry coal transport system 211 is coupled in flow communication with a carbonaceous fuel source 502, that is, a dry coal source 502 via conduit 212. In the exemplary embodiment, conduit 212 is coupled to any dry coal source 502 that has coal characteristics that enable system 211 to operate as described herein. Also, dry coal transport system 211 is coupled in flow communication with an inert gas, that is, a nitrogen gas source 504 via conduit 213. In the exemplary embodiment, the inert gas used is nitrogen. Alternatively, any inert gas that enables system 211 to operate as described herein may be used. In the exemplary embodiment, nitrogen is channeled to system 211 at any pressure that enables operation of system 211 as described herein.

In the exemplary embodiment, dry coal transport system 211 includes a plurality of raw coal feed bins 506 (only one shown). Each bin 506 is coupled in flow communication with at least a portion of conduit 212 via a conduit 508 that includes an associated raw coal magnetic separator 510 coupled therein. Each raw coal feed bin 506 is coupled in flow communication with an associated raw coal feeder 512 (only one shown) via a respective second raw coal conduit 512 (only one shown). Each raw coal feeder 512 is coupled in flow communication with a respective screw conveyor 514 (only one shown) via an associated third raw coal conduit 516 (only one shown). Alternatively, in lieu of screw conveyor 514, any coal transfer device that enables operation of system 211 as described herein may be used, including, but not limited to, a belt conveyor.

Also, in the exemplary embodiment, dry coal transport system 211 includes a plurality of grinding mill and dryer assemblies 518 (only one shown). Each assembly 518 is coupled in flow communication with a respective screw conveyor 514 via a fourth raw coal conduit 520 (only one shown). Grinding mill and dryer assembly 518 includes any coal-crushing devices and any drying devices that enable system 211 to operate as described herein.

Further, in the exemplary embodiment, dry coal transport system 211 includes a plurality of steam heating devices 522. Devices 522 include a first steam heating device 524, a second heating device 526, and a third heating device 528. Nitrogen gas source 504 is coupled in flow communication with first steam heating device 524 via at least one conveying fluid conduit, that is, inert gas supply conduit 213, herein referred to as nitrogen supply conduit 213. Moreover, first and second steam heating devices 524 and 526, respectively, are each coupled in flow communication by a first nitrogen interconnecting conduit 530, and second and third steam heating devices 526 and 528, respectively, are each coupled in flow communication by a second nitrogen interconnecting conduit 532. In the exemplary embodiment, heating devices 524, 526, and 528 are shell and tube heat exchangers that include at least one heating element 534, 536, and 538, respectively. Alternatively, heating devices 524, 526, and 528 are any heat transfer devices that enable operation of system 211 as described herein. Also, in the exemplary embodiment, conduits 530 and 532 serially couple heating devices 524, 526, and 528 in succession. Alternatively, any number of heating devices in any configuration that enables operation of system 211 as described herein is used.

In the exemplary embodiment, first steam heating device 524 is coupled in flow communication with a first, i.e., a low pressure steam source 540 and a low pressure steam return device 542. Also, second steam heating device 526 is coupled in flow communication with a second, i.e., an intermediate pressure steam source 544 and an intermediate pressure steam return device 546. Further, third steam heating device 528 is coupled in flow communication with a third, i.e., a high pressure steam source 548 and a high pressure steam return device 550. In the exemplary embodiment, steam sources 540, 544, and 548 are supplied by HRSG 142 (shown in FIG. 1). Alternatively, steam sources 540, 544, and 548 may be any steam sources that enable operation of system 211 as described herein including, but not limited to, hot condensate. More specifically, in the exemplary embodiment, steam sources 540, 544, and 548 supply steam at any thermodynamic conditions, including, but not limited to, any enthalpies that enable operation of system 211 as described herein. Furthermore, alternative heat sources that enable operation of system 211 as described herein may be used including, but not limited to, natural gas-fired devices, syngas-fired devices, and flue gas heat recovery devices.

Steam heating device 528 is coupled in flow communication with each grinding mill and dryer assembly 518 via a heated conveying gas supply conduit 552. Nitrogen (not shown) heated to a predetermined temperature is channeled from heating device 528 to each assembly 518. Each assembly 518 also receives dry raw coal via associated conduit 520. Each assembly 518 crushes, or grinds the dry raw coal to smaller, or ground pieces, facilitates drying the ground coal to a predetermined moisture content in conjunction with the received heated nitrogen, and channels the heated nitrogen through assembly 518 to facilitate entraining the ground coal within a heated nitrogen stream (not shown) to facilitate conveying the heated and dried ground coal (not shown) within system 211 as described herein.

Each grinding mill and dryer assembly 518 is coupled in flow communication with at least one cyclone separator 554, that is, in the exemplary embodiment, a first cyclone separator 554 and a second cyclone separator 556. In the exemplary embodiment, cyclone separators 554 and 556 are configured in a parallel configuration. Alternatively, each assembly 518 may be coupled in flow communication with any number of cyclone and/or separators in any configuration that enables operation of system 211 as described herein. First cyclone separator 554 and assembly 518 are coupled in flow communication by a first grinding mill and dryer assembly discharge conduit 558 and second cyclone separator 556 and assembly 518 are coupled in flow communication by a second grinding mill and dryer assembly outlet conduit 560. Cyclone separators 554 and 556 receive dried ground coal from assembly 518 and use a cyclonic action to separate coal from at least a portion of conveying nitrogen gas.

In the exemplary embodiment, dry coal transport system 211 includes a plurality of vibrating screens 562 (only one shown). Each vibrating screen 562 is coupled in flow communication with first cyclone separator 554 via a first cyclone separator outlet conduit 564 and with second cyclone separator 556 via a second cyclone separator outlet conduit 566. Each vibrating screen 562 discriminates the pieces of dry ground coal and channels improperly-sized coal to assembly 518 via a coal conduit 568 that is coupled in flow communication with both vibrating screen 562 and assembly 518.

Also, in the exemplary embodiment, dry coal transport system 211 includes a ground coal storage bin 570 that is coupled in flow communication with each vibrating screen 562 via a plurality of coal conduits 572 and via a common coal conduit 573. Each vibrating screen 562 discriminates the pieces of dry ground coal and channels properly-sized coal to ground coal storage bin 570 via properly-sized coal conduit 572 during normal operation of system 211. Moreover, in the exemplary embodiment, dry coal transport system 211 includes a properly-sized coal startup conduit 574 that couples vibrating screen 562 in flow communication with assembly 518 and that channels properly-sized coal to assembly 518 during startup operation of system 211.

In the exemplary embodiment, dry coal transport system 211 includes a plurality of first cyclone separator bag houses 576 (only one shown) coupled in flow communication with first cyclone separator 554 via a first cyclone separator vent gas conduit 578, second cyclone separator 556 via a second cyclone separator vent gas conduit 580, vibrating screen 562 via a vibrating screen vent gas conduit 582, and a common bag house inlet conduit 584. Each separator bag house 576 is also coupled in flow communication with a bag house purge gas source 586 via a common purge gas conduit 588 and a first bag house purge gas conduit 590. In the exemplary embodiment, the inert gas used is nitrogen. Alternatively, any inert gas that enables system 211 to operate as described herein may be used.

In addition, in the exemplary embodiment, dry coal transport system 211 includes a at least one hopper bag house 592 that is coupled in flow communication with each raw coal feed bin 506 via a hopper coal dust conduit 594 and via a common coal dust conduit 596. Hopper bag house 592 is also coupled in flow communication with ground coal storage bin 570 via a storage bin coal dust collection conduit 598 and common coal dust conduit 596. In addition, Hopper bag house 592 is coupled in flow communication with bag house purge gas source 586 via common purge gas conduit 588 and a second bag house purge gas conduit 600. Hopper bag house 592 is also coupled in flow communication with ground coal storage bin 570 via a storage bin coal dust return conduit 602. Ground coal storage bin 570 is coupled in flow communication with each first cyclone separator bag house 576 via a coal dust return startup conduit 604 and storage bin coal dust return conduit 602. Conduit 604 is normally not in service, but is used during startup operations of system 211. Hopper bag house 592 is further coupled in flow communication with at least one hopper fan blower 606 via a hopper bag house vent conduit 608, such that blower 606 channels air and nitrogen to atmosphere via a vent conduit 607.

Further, in the exemplary embodiment, dry coal transport system 211 includes at least one second cyclone separator bag house 610 that is coupled in flow communication with bag house purge gas source 586 via common purge gas conduit 588 and a third bag house purge gas conduit 612. Second cyclone separator bag house 610 is also coupled in flow communication with ground coal storage bin 570 via a coal dust return conduit 614 and storage bin coal dust return conduit 602. Second cyclone separator bag house 610 is further coupled in flow communication with at least one cyclone separator fan blower 616 via a cyclone separator bag house vent conduit 618, wherein blower 616 channels air and nitrogen to atmosphere via an emissions control device 620. In the exemplary embodiment, emissions control device 620 includes a bed of activated charcoal that facilitates capture of volatile organic compounds (VOCs) and devolatalized materials, including, but not limited to mercury. Alternatively, emissions control device 620 uses any mercury collection methods that enable operation of system 211 as described herein. Emissions control device 620 is vented to atmosphere via a vent conduit 621.

Furthermore, in the exemplary embodiment, dry coal transport system 211 includes at least one recycle nitrogen fan blower 622 that is coupled in flow communication with each first cyclone separator bag house 576 via a recycle nitrogen fan blower inlet conduit 624. Fan blower 622 is also coupled in flow communication with supply conduit 213 via a recycle nitrogen fan blower outlet conduit 626. At least one vapor condensing apparatus 625 is positioned within conduit 626 to facilitate removing water vapor entrained within the recycle nitrogen. A vapor condensing apparatus bypass conduit 627 is coupled in flow communication to conduit 626 and facilitates temperature control and flow control of recycle nitrogen in conjunction with vapor condensing apparatus 625. Moreover, fan blower 622 is coupled in flow communication with second cyclone separator bag house 610 via a recycle nitrogen coal dust removal conduit 628, such that entrained coal dust within a recycle nitrogen stream (not shown) is collected within second cyclone separator bag house 610 and is channeled to ground coal storage bin 570 via coal dust return conduit 614 and storage bin coal dust return conduit 602. Recycle nitrogen fan blower outlet conduit 626 is also coupled in flow communication with grinding mill and dryer assemblies 518 via conduit 552 and a steam heating device startup bypass conduit 630. Conduit 630 is normally not in service but is rather used during startup operations of system 211.

Further, in the exemplary embodiment, dry coal transport system 211 includes a plurality of pump feed hoppers 632 (only one shown) that are coupled in flow communication with ground coal storage bin 570 via a ground coal storage bin outlet conduit 634 and via a pump feed hopper inlet conduit 636. Each pump feed hopper 632 is coupled in flow communication with each separator bag house 576 via a pump feed hopper vent conduit 638 and a common pump and hopper vent conduit 640.

Also, in the exemplary embodiment, dry coal transport system 211 includes a plurality of dry feed pumps 642 (only one shown). Each dry feed pump 642 is coupled in flow communication with an associated pump feed hopper 632 via a dry feed pump inlet conduit 644 and via an associated pump feed magnetic separator 646. Each dry feed pump 642 is coupled in flow communication with first cyclone separator bag house 576 via common pump and hopper vent conduit 640, a dry pump startup vent conduit 648, and a common dry pump startup vent conduit 650.

Further, in the exemplary embodiment, dry coal transport system 211 includes a high pressure (HP) conveyance vessel 652 that is coupled in flow communication with dry feed pumps 642 via a dry feed pump discharge conduit 654 and a common dry feed pump discharge conduit 656. HP conveyance vessel 652 is coupled to gasification reactor 208 via a discharge conduit 658, a common coal conduit 660, and transport conduit 214.

Also, in the exemplary embodiment, dry coal transport system 211 includes a common HP conveyance gas supply conduit 662. Conduit 662 is coupled in flow communication with HP conveyance vessel 652 via a first HP conveyance vessel gas inlet conduit 664, and a second HP conveyance vessel gas inlet conduit 666 that is coupled in flow communication with a conveyance gas conduit 668. Conduit 662 is also coupled in flow communication with a compressed recycled carbon dioxide ($CO_2$) source 670. Conduit 662 is further coupled in flow communication with a startup nitrogen conduit 672 and a nitrogen source 674. Nitrogen source 674 is coupled in flow communication with a common pump seal header 676 and a plurality of pump seal supply headers 678. An optional cross-conduit 680 that couples common dry feed pump discharge conduit 656 with common HP conveyance gas supply conduit 662 may be used with system 211. In the exemplary embodiment, nitrogen is used as the startup conveyance gas and recycled $CO_2$ is used as the conveyance gas after startup is complete. Alternatively, any conveyance gases in any combination are used that enable operation of system 211 as described herein.

Further, in the exemplary embodiment, dry coal transport system 211 includes a startup cyclone 682 that is coupled in flow communication with a startup dry coal conduit 684. Conduit 684 is coupled in flow communication with conduit 660. Also, in the exemplary embodiment, a startup flow restriction orifice 683 is positioned within conduit 684, and dry coal transport system 211 includes a startup bag house 685 that is coupled in flow communication with startup cyclone 682 via a gas vent conduit 686. Startup bag house 685 is coupled in flow communication with common purge gas conduit 588 via a gas purge conduit 688, and bag house 685 is vented to atmosphere via a vent conduit 690. Startup bag house 685 is also coupled in flow communication with ground coal storage bin 570 via a startup bag house coal dust return conduit 692 and storage bin coal dust return conduit 602.

In the exemplary embodiment, dry coal transport system 211 also includes a startup recycle solids hopper 694 that is coupled in flow communication with startup cyclone 682 via a startup cyclone outlet conduit 696. Startup recycle solids hopper 694 is coupled in flow communication with ground coal storage bin 570 via a startup recycle solids hopper outlet conduit 698.

In operation, dry coal transport system 211 receives dry raw coal from dry coal source 502 via conduit 212. In the exemplary embodiment, the dry raw coal has an upper unit size of approximately 4.08 centimeters (cm) (2 inches (in.)). Alternatively, coal sized smaller or larger then that enables operation of system 211 as described herein. The dry raw coal is channeled via gravity feed to a plurality of raw coal feed bins 506 via conduit 508 and through coal magnetic separator 510. Hopper bag house 592, in cooperation with hopper fan blower 606 collects coal dust associated with coal transfer into raw coal feed bins 506 via conduits 594 and 596, and channels agglomerated coal dust via gravity feed to ground coal storage bin 570 via storage bin coal dust return conduit 602. Magnetic separator 510 removes of foreign metallic materials that are entrained within the dry raw coal. Each raw coal feed bin 506 channels dry raw coal via gravity feed to coal feeder 512 via conduit 512. Each raw coal feeder 512 channels dry raw coal via gravity feed to screw conveyor 514 via conduit 516. Screw conveyor 514 channels dry raw coal to grinding mill and dryer assembly 518 via conduit 520.

Also, during operation, dry coal transport system 211 receives makeup nitrogen gas via conduit 213 from nitrogen gas source 504. Such nitrogen gas is channeled into system 211 to facilitate maintaining a predetermined volume of nitrogen gas within system 211. Makeup nitrogen gas from source 504 is mixed with recycled nitrogen gas channeled to conduit 213 via conduit 626. Recycled nitrogen gas is pre-warmed, and mixing such recycle nitrogen gas with makeup nitrogen gas facilitates decreasing an amount of heat energy needed to heat the conveyance nitrogen gas via plurality of steam heating devices 522. As such, thermal efficiency of IGCC power generation plant 100 is facilitated to be increased. Moreover, removal of water vapor from recycle nitrogen gas via vapor condensing apparatus 625 is facilitated. Moreover, temperature control and flow control of recycle nitrogen gas is facilitated with vapor condensing apparatus bypass conduit 627 in conjunction with vapor condensing apparatus 625.

Moreover, during operation, mixed nitrogen gas, having a first temperature, is channeled through first steam heating device 524 to enable low pressure steam from low pressure steam source 540 to be channeled through heating element 534 to low pressure steam return device 542. The nitrogen gas exits heating device 524 at a second temperature that is greater than the first temperature. Nitrogen gas, at the second temperature, is then channeled through second steam heating device 526, wherein intermediate pressure steam from intermediate pressure steam source 544 is channeled through heating element 536 to intermediate pressure steam return device 546. The nitrogen gas then exits heating device 526 at third temperature that is higher than the second temperature. Subsequently, nitrogen gas, at the third temperature, is channeled through third steam heating device 528, wherein high pressure steam from high pressure steam source 548 is channeled through heating element 538 to high pressure steam return device 550, prior to exiting heating device 528 at a fourth temperature that is higher than the third temperature. Nitrogen gas at the fourth temperature is channeled to heated conveying gas supply conduit 552.

Under certain operational conditions, that may include startup of system 211, at least a portion of recycled nitrogen is bypassed around plurality of steam heaters 522 via bypass conduit 630 and is then channeled directly to conduit 552.

In the exemplary embodiment, steam heating devices 522 heats dry raw coal to the predetermined fourth temperature of approximately 16.67 degrees Celsius (° C.) (30 degrees Fahrenheit (° F.)) above a dew point of the nitrogen gas. Alternatively, the dry raw coal and nitrogen gas are heated to any temperature that enables operation of system 211 as described herein. Moreover, steam heating devices 522 dry the coal to any predetermined moisture content value that enables operation of system 211 as described herein.

In operation, conveyance nitrogen that is heated to the predetermined temperature is channeled from heating device 528 to each grinding mill and dryer assembly 518 via conduit 552. Moreover, each assembly 518 also receives dry raw coal via associated conduit 520, wherein each assembly 518 crushes, or grinds the dry raw coal to smaller, or ground pieces, facilitates drying the ground coal to a predetermined moisture content in cooperation with the received heated nitrogen, and channels the heated nitrogen through assembly 518 to facilitate entraining the ground coal within a heated nitrogen stream. Each assembly 518 discharges a heated, dried, and ground coal and conveying nitrogen stream into discharge conduits 558 and 560, respectively.

Also, in operation, at least a portion of the heated, dried, and ground coal and conveying nitrogen stream is channeled into each of first cyclone separator 554 and second cyclone separator 556 via conduits 558 and 560, respectively. Cyclone separators 554 and 556 receive the heated, dried, and ground coal and conveying nitrogen stream from assembly 518 and use cyclonic action to separate ground coal from at least a portion of conveying nitrogen gas. A substantial portion of the nitrogen gas, with some entrained coal dust, is channeled from each separator 554 and 556 via conduits 578 and 580, respectively, and is channeled to first cyclone separator bag house 576. Moreover, coal dust collected from vibrating screens 562, is channeled to bag house 576 via conduit 582. Bag house 576 facilitates separating coal dust entrained within the nitrogen gas from the gas, channeling agglomerated coal dust via gravity feed to ground coal storage bin 570 via conduits 604 and 602, and channeling the nitrogen to fan blower 622 via conduit 624, wherein recycled nitrogen is channeled toward plurality of steam heating devices 522.

Further, in operation, heated, dried, and ground coal is channeled from cyclone separators 554 and 556 via conduits 564 and 566, respectively, and channeled to vibrating screens 562. Each vibrating screen 562 discriminates the pieces of heated, dried, and ground coal with respect to size and returns improperly-sized coal to assembly 518 via conduit 568 for further grinding. In the exemplary embodiment, each vibrating screen 562 has a top size of approximately 0.254 centimeters (cm) (0.1 inches (in.)). During normal operation of system 211, properly-sized coal is typically channeled to ground coal storage bin 570 via coal conduit 572 and common coal conduit 573 during normal operation of system 211. Collection of coal dust from storage bin 570 is facilitated by bag house 592 and fan blower 606 via conduit 598. Agglomerated coal dust is channeled via gravity feed to storage bin 570 via conduit 602. Moreover, during startup operation of system 211, properly-sized coal is channeled to assembly 518 via coal startup conduit 574.

Also, in operation, dust removal conduit 628 channels a portion of recycled nitrogen with entrained coal dust from fan blower 622 via conduit 628 to second cyclone separator bag house 610. In bag house, at least a portion of entrained coal dust is collected and agglomerated coal dust is channeled via gravity feed to ground coal storage bin 570 via coal dust return conduit 614 and storage bin coal dust return conduit 602. Moreover, blower 616 channels air and nitrogen to atmosphere via emissions control device 620 that includes a bed of activated charcoal.

Further, in operation, dry, heated, and ground coal, including agglomerated coal dust, is channeled via gravity feed from storage bin 570 via conduit 634 and conduit 636 to feed hoppers 632. Coal dust generated by channeling coal into hoppers 632 is channeled to bag house 576 via vent conduit 638 and common pump and hopper vent conduit 640, wherein agglomerated coal dust is channeled via gravity feed to ground coal storage bin 570 via conduits 604 and 602.

Also, in operation, dry, heated, and ground coal is channeled via gravity feed from pump feed hoppers 632 to dry feed pumps 642 via inlet conduits 644, wherein magnetic separators 646 remove foreign metallic materials entrained within the coal. Coal dust generated by each pump 642 is channeled to bag house 576 via vent conduit 648, vent conduit 650, and common pump and hopper vent conduit 640.

Further, in operation, dry, heated, and ground coal is channeled from dry feed pumps 642 to HP conveyance vessel 652 via discharge conduits 654 and pump discharge conduit 656. In normal operation, $CO_2$ is channeled from $CO_2$ source 670 to HP conveyance vessel 652 via conduits 662 and 664, wherein dry, heated, and ground coal within HP conveyance vessel 652 is at least partially fluidized. Moreover, additional $CO_2$ is channeled to HP conveyance vessel 652 via conduits 668 and 666 to transport the dry, heated, and ground coal. Dry, heated, and ground coal is conveyed from HP conveyance vessel 652 to gasification reactor 208 via HP conveyance vessel discharge conduit 658, a conduit 660, and conduit 214. Drying, heating, grinding, and fluidizing the coal as described herein facilitates providing uniform flow to gasification reactor 208 and facilitates improving a residence time of the coal in reactor 208. In startup operation, nitrogen channeled from nitrogen source 674 is used to convey dry, heated, and ground coal from HP conveyance vessel 652 to coal conduit 684.

Also, in operation, during startup periods, reactor 208 is not ready to receive a significant amount of coal. However, sufficient coal flow to reactor 208 is established to support pressure ramping operations between atmospheric pressure and 1,724 kilopascal (kPa) (250 pounds per square inch (psi)). Therefore, to support such coal flow to reactor 208, excess coal flow is channeled through a coal recirculation/startup loop that includes, but is not limited to, conduit 684, orifice 683, separator 682, and solids hopper 694.

Therefore, in operation, dry, heated, and ground coal is channeled from startup dry coal conduit 684 to startup cyclone 682 via conveying gas. In the exemplary embodiment, the pressure of coal and nitrogen in conduit 684 upstream of startup flow restriction orifice 683 is approximately 6,895 kPa (1000 psi). Such coal and nitrogen are channeled through startup flow restriction orifice 683. Orifice 683 restricts flow and induces a pressure drop that facilitates operation of system 211 during periods when an operational pressure within reactor 208 is within a startup range. That is, in the exemplary embodiment, approximately atmospheric pressure to approximately 1,724 kPa (250 psi). Alternatively, any pressure range for startup operations that enables operation of system 211 and IGCC power generation plant 100 as described herein may be used.

Startup cyclone 682 facilitates separating the nitrogen and coal, such that nitrogen with entrained coal dust is vented to startup bag house 685. Agglomerated coal dust is channeled via gravity feed from bag house 685 to ground coal storage bin 570 via conduit 692 and storage bin coal dust return conduit 602. Dry, heated, and ground coal are channeled via gravity feed from startup cyclone 682 to startup recycle solids hopper 694 via conduit 696 and from hopper 694 to coal storage bin 570 via conduit 698. As reactor 208 pressure exceeds approximately 1,724 kPa (250 psi) and is ramped up to approximately 4,482 kPa (650 psi), flow through conduit 684 is reduced and flow through conduit 214 is increased.

Further, in operation, nitrogen from bag house purge gas source 586 is channeled to bag houses 576, 592, 610, and 685 to facilitate purging air from bag houses 576, 592, 610, and 685. Such purging nitrogen is either vented to atmosphere or is used as recycle nitrogen as described above. Moreover, nitrogen from nitrogen source 674 is channeled to each pump 642 to facilitate sealing pumps 642.

FIG. 3 is a flow chart illustrating an exemplary method 700 of operating gasification facility, and more specifically, exemplary IGCC power generation plant 100 (shown in FIGS. 1 and 2). In the exemplary embodiment, at least a portion of a conveying fluid, that is, nitrogen gas at a first temperature is channeled 702 through vapor condensing apparatus 625 (shown in FIG. 2). The nitrogen gas is channeled 704 through a plurality of steam heating devices 522 (shown in FIG. 2), wherein at least some of the steam heating devices 522 are coupled in serial flow communication via at least one conveying fluid conduit, that is, conduits 530 and 532 (both shown in FIG. 2).

Therefore, in the exemplary embodiment, steam at a first predetermined pressure is channeled 706 to first steam heating device 524 (shown in FIG. 2). The conveying fluid, at the first temperature, is channeled 708 through first steam heating device 524 such that the nitrogen gas is heated to a second predetermined temperature that is higher than the first temperature. Steam at the second predetermined pressure is channeled 710 to second steam heating device 526 (shown in FIG. 2). The nitrogen gas at the second predetermined temperature is channeled 712 to second steam heating device 526 wherein the nitrogen gas is heated to a third predetermined temperature. The nitrogen gas, at the third predetermined temperature, is channeled 714 to third steam heating device 528 (shown in FIG. 2), wherein the gas is heated to a fourth predetermined temperature. The nitrogen gas, at that fourth predetermined temperature, is then channeled 716 to a solids conveyance system, i.e., coal transport system 211 (shown in FIGS. 1 and 2). Solids, such as coal, are entrained and transported 718 to reactor 208 (shown in FIGS. 1 and 2). Further, in the exemplary embodiment, at least a portion of the nitrogen gas and at least a portion of the entrained solids are channeled 720 through at least one emissions control device 620 (shown in FIG. 2).

Described herein are exemplary embodiments of methods and apparatus that facilitate the production of synthetic gas (syngas). Specifically, the methods and apparatus described herein facilitate heating a conveying gas used to transport a dry fuel to produce such syngas, and more specifically, facilitate heating nitrogen gas to transport a dry coal to a gasification reactor. Heating the conveyance nitrogen gas to predetermined temperatures facilitates drying ground coal to a predetermined moisture content prior to the heated and dried ground coal being supplied to a gasification reactor. Drying, heating, and conveying the coal as described herein facilitates providing a more uniform flow to the gasification reactor and facilitates improving a residence time of the coal in the reactor. Improving a residence time of the coal in the reactor facilitates improving the efficiency of carbon conversion therein which facilitates reducing operational costs associated with syngas production. Moreover, such improvements in efficiency facilitate broadening a range of coals that may be used within any one gasification facility. Further, channeling coal dust-laden nitrogen through a emissions control device that includes a bed of activated charcoal that collects mercury-laden coal dust and volatile matter facilitates satisfying local environmental requirements.

The methods and systems described herein are not limited to the specific embodiments described herein. For example, components of each system and/or steps of each method may be used and/or practiced independently and separately from other components and/or steps described herein. In addition, each component and/or step may also be used and/or practiced with other assembly packages and methods.

While the invention has been described in terms of various specific embodiments, those skilled in the art will recognize that the invention can be practiced with modification within the spirit and scope of the claims.

What is claimed is:

1. A method of operating a gasification facility, said method comprising:
channeling a conveying fluid at a first temperature through a first steam heating device to increase the temperature of the conveying fluid to a second predetermined temperature;
channeling the conveying fluid at the second predetermined temperature through a second steam heating device to increase the temperature of the conveying fluid to a third predetermined temperature;
channeling the conveying fluid at the third predetermined temperature to a solids conveyance system, wherein solids within the conveying fluid are entrained within the conveying fluid;
transporting at least a portion of the entrained solids to at least one separation device;
separating the conveying fluid from the entrained solids within the at least one separation device;
channeling a first portion of the conveying fluid from the at least one separation device to at least one vapor condensing apparatus;
removing liquid from the first portion of the conveying fluid within the at least one vapor condensing apparatus;
channeling the first portion of the conveying fluid to the first and second steam heating devices; and
channeling a second portion of the conveying fluid from the at least one separation device through a vapor condensing apparatus bypass conduit coupled in parallel to the at least one separation device and the first and second steam heating devices.

2. A method in accordance with claim 1 wherein channeling the conveying fluid at the second predetermined temperature through a second steam heating device comprises channeling the conveying fluid through a plurality of steam heating devices, wherein at least a portion of the plurality of steam heating devices are coupled together in serial flow communication.

3. A method in accordance with claim 2 wherein channeling the conveying fluid through a plurality of steam heating devices comprises increasing the temperature of the conveying fluid to a fourth predetermined temperature.

4. A method in accordance with claim 2 wherein channeling the conveying fluid through a plurality of steam heating devices comprises:
channeling steam at a first predetermined pressure to the first steam heating device; and
channeling steam at a second predetermined pressure to the second steam heating device.

5. A method in accordance with claim 1 further comprising channeling at least a portion of the conveying fluid at the first temperature through the at least one vapor condensing apparatus.

6. A method in accordance with claim 1 further comprising channeling at least a portion of the conveying fluid and at least a portion of the entrained solids through at least one emissions control device.

7. A gasification facility comprising:
a carbonaceous fuel source;
at least one inert gas source;
a gasification reactor; and
a coal transport system coupled in flow communication with said carbonaceous fuel source, said at least one inert gas source, and said gasification reactor, said coal transport system comprising:
at least one conveying fluid conduit coupled in flow communication to said at least one inert gas source;
a plurality of steam heating devices coupled together in flow communication by said at least one conveying fluid conduit
at least one solids transport conduit coupled in flow communication with said at least one conveying fluid conduit;
at least one separation device coupled in flow communication with said at least one solids transport conduit and said at least one conveying fluid conduit, said at least one separation device configured to separate a conveying fluid from solids;
at least one vapor condensing apparatus coupled in flow communication with said at least one separation device and said plurality of steam heating devices, said at least one vapor condensing apparatus configured to remove liquid from the conveying fluid prior to recycling the conveying fluid to said plurality of steam heating devices; and
a vapor condensing apparatus bypass conduit coupled in parallel to said at least one separation device and said plurality of steam heating devices, said vapor condensing apparatus bypass conduit configured to facilitate temperature control of the conveying fluid.

8. A gasification facility in accordance with claim 7 wherein said plurality of steam heating devices comprise:
a first steam heating device;

a second steam heating device coupled in flow communication to said first steam heating device; and a third steam heating device coupled in flow communication to said second steam heating device.

9. A gasification facility in accordance with claim 8 wherein said plurality of steam heating devices further comprises:

said first steam heating device coupled in flow communication to a first steam source at a first predetermined pressure;

said second steam heating device coupled in flow communication to a second steam source at a second predetermined pressure; and said third steam heating device coupled in flow communication to a third steam source at a third predetermined pressure.

10. A gasification facility in accordance with claim 7 further comprising at least one emissions control device coupled in flow communication with said at least one solids transport conduit, wherein said at least one emissions control device facilitates capture of mercury and volatile organic compounds (VOCs).

\* \* \* \* \*